United States Patent [19]

Moss

[11] Patent Number: 4,492,347
[45] Date of Patent: Jan. 8, 1985

[54] ANTI-REVERSE MECHANISM

[75] Inventor: Elvis W. Moss, Tulsa, Okla.

[73] Assignee: Brunswick Corporation, Skokie, Ill.

[21] Appl. No.: 517,735

[22] Filed: Jul. 28, 1983

Related U.S. Application Data

[63] Continuation of Ser. No. 398,414, Jul. 14, 1982, abandoned, which is a continuation of Ser. No. 218,920, Dec. 22, 1980, abandoned.

[51] Int. Cl.³ .................. A01K 89/01; A01K 89/02
[52] U.S. Cl. ........................... 242/84.2 R; 74/576
[58] Field of Search ................ 242/84.1 R, 84.2 R, 242/84.2 A, 84.21 R, 84.21 A, 84.51 A, 84.5 A; 74/576

[56] References Cited

U.S. PATENT DOCUMENTS

| | | | |
|---|---|---|---|
| 1,163,815 | 12/1915 | Everson | 74/576 |
| 1,811,073 | 6/1931 | Burdick | 74/576 |
| 2,354,530 | 7/1944 | McMahon | 74/576 |
| 3,489,365 | 1/1970 | Hull | 242/84.2 A |
| 3,794,264 | 2/1974 | Hull | 242/84.2 A |

Primary Examiner—Billy S. Taylor
Attorney, Agent, or Firm—Wood, Dalton, Phillips, Mason & Rowe

[57] ABSTRACT

A spin casting style fishing reel is provided with an anti-reverse mechanism that prevents the crank assembly from being rotated in one direction. A pawl actuator is rotated by the crank assembly rotating in one direction to activate an anti-reverse pawl which engages a ratchet to arrest further rotation of the crank assembly. Rotation of the crank assembly in the other direction rotates the pawl actuator to move the anti-reverse pawl out of interferring relation with the ratchet to permit free rotation of the crank assembly in said other direction.

4 Claims, 7 Drawing Figures

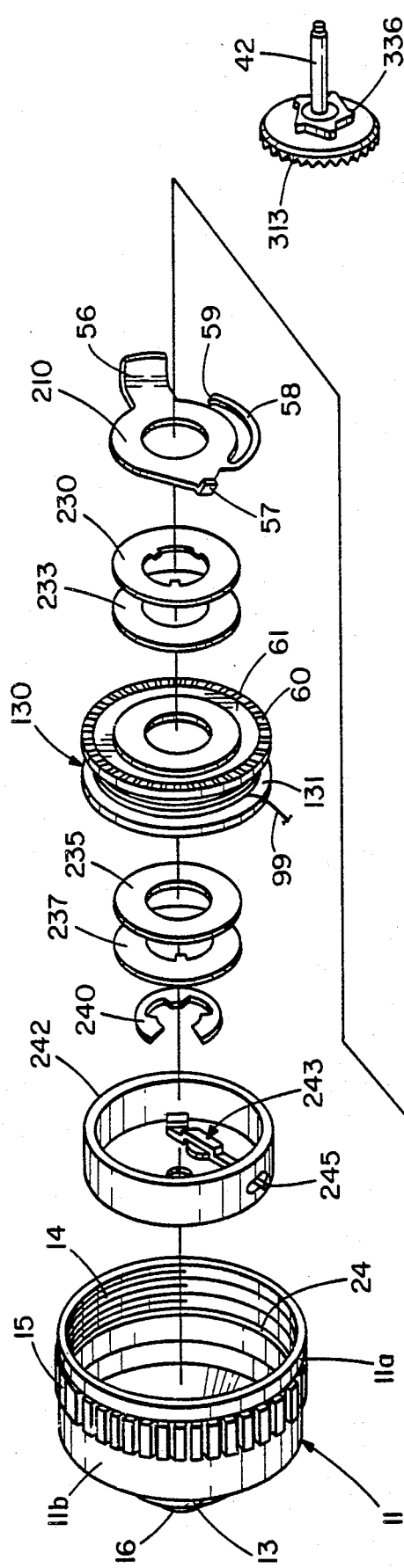
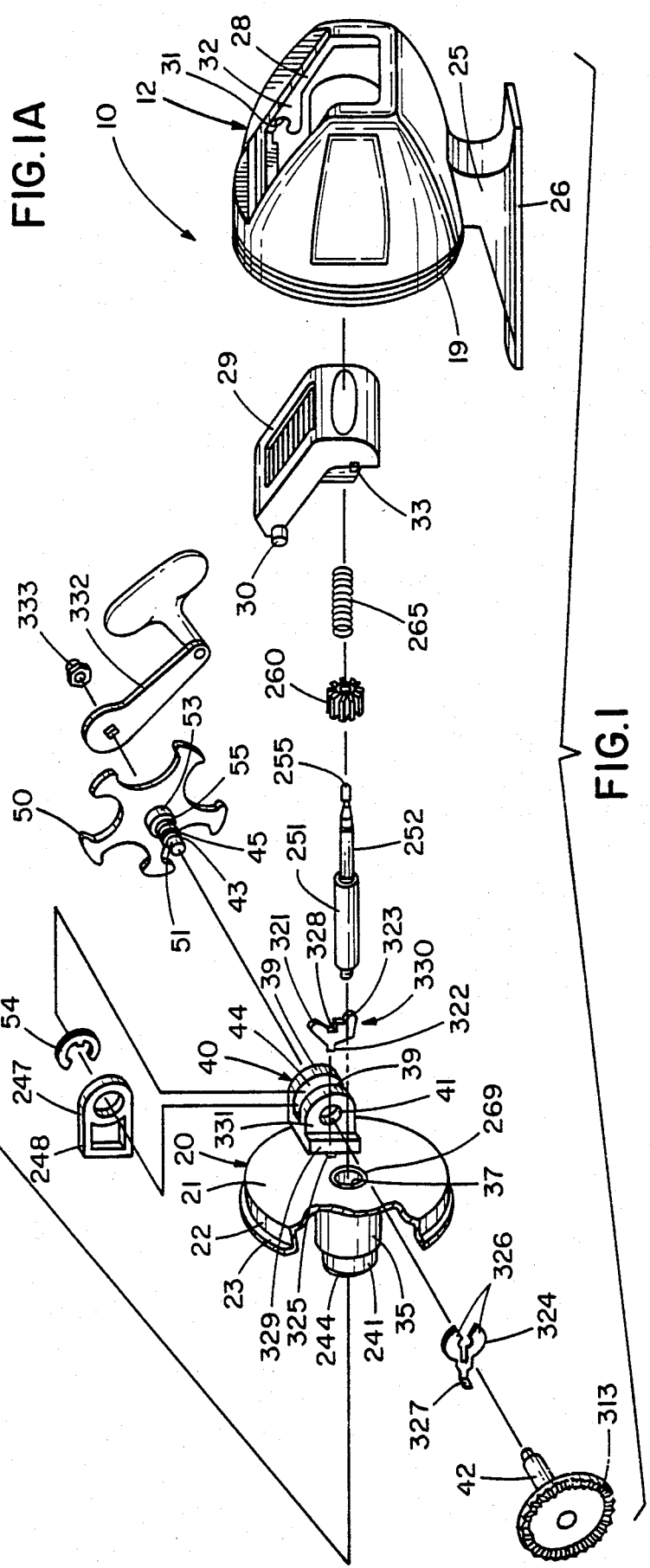

ANTI-REVERSE MECHANISM

This is a continuation of application Ser. No. 398,414, filed July 14, 1982 which is a continuation of Ser. No. 218,920, filed Dec. 22, 1980, both abandoned.

DESCRIPTION

1. Technical Field

This invention relates to a spin casting style fishing reel and, more particularly, relates to a spin casting style fishing reel having a unique anti-reverse mechanism.

2. Background Art

Many types of anti-reverse mechanisms have been employed in the prior art to prevent the inadvertent reverse rotation of the crank handle of a spin casting style fishing reel. One exemplary mechanism is that described in the Hull U.S. Pat. No. 3,794,264. In Hull the crank shaft, which is operated by the crank handle, is rotated in a first direction to retrieve fishing line. The crank shaft has located thereon a ratchet which in turn is contacted by a pivoting pawl. As the crank handle and its crank shaft are rotated to reel in line, the pawl pivots in response to the tapered teeth on the ratchet to allow continuous, unfettered rotation of said crank handle. Should the handle be reversely rotated, the pawl, subjected to gravitational forces, engages and holds the ratchet preventing such rotation.

The aforementioned anti-reverse mechanism and others like it have encountered several drawbacks. One such drawback is that of ratchet wear. The pawl is continuously sliding up and over the ratchet teeth which, through prolonged use, eventually wears the ratchet teeth effecting the mechanism's performance. A second problem experienced by said mechanisms, is that often, due to the reel's environment, foreign material will accumulate within the reel to prevent or hinder the pivoting of the pawl to engage or disengage the ratchet. This in turn enables the crank handle and shaft to be rotated in a reverse direction thereby seriously effecting the reel's reliability.

The present anti-reverse mechanism described in this application is directed toward the problems heretofore encountered.

DISCLOSURE OF THE INVENTION

This application presents an anti-reverse mechanism for a spin casting style fishing reel wherein the anti-reverse mechanism is not subjected to excessive wear and where the mechanism is positively driven thereby increasing the reel's reliability.

Toward this end an anti-reverse mechanism is provided in a spin casting style fishing reel which is operated by the turning of a crank handle. The crank handle, in turn, rotates a crank shaft which drives the reel's fishing line retrieval mechanism. The anti-reverse mechanism has a ratchet attached to the crank shaft and a pawl pivotally mounted contiguous to the ratchet. Frictionally mounted on the crank shaft so as to also engage the pawl is a pawl actuator.

As the crank begins its rotation to retrieve fishing line, the pawl actuator pivots in the same direction. In doing so the pawl actuator pivots the pawl out of engagement with the ratchet thereby allowing unimpeded rotation of the crank handle. Once the pawl is fully pivoted the frictional force holding the pawl actuator stationary on the crank shaft is overcome thereby allowing the crank shaft to rotate relative to the pawl actuator. Reverse rotation of the crank handle causes the pawl actuator, held fixed once again to the crank shaft by friction, to reverse pivot. This motion causes the pawl to likewise pivot into and engage the ratchet to forbid further reverse rotation.

From the above it is an object of this application to set forth an anti-reverse mechanism which does not wear upon the anti-reverse ratchet. The pawl comes in contact with the ratchet only upon the initiation of reverse rotation of the crank handle.

It is a further object to provide an anti-reverse mechanism which positively drives the pawl for engagement and disengagement of the ratchet thereby contributing to the reel's reliability. Foreign material within the reel housing cannot effect the proper pivoting operation of the pawl since the pawl is subjected to a positive force which can overcome any impedence induced by the foreign material. Further, the pivoting of the pawl is not driven soley due to gravitational forces.

Further objects and advantages will become apparent from a study of the following portions of the specification, the claims and the attached drawings.

BRIEF DESCRIPTION OF DRAWINGS

FIG. 1 is an exploded perspective view of a spin casting style fishing reel employing the anti-reverse mechanism;

FIG. 1a is a perspective view of the crankshaft showing the ratchet;

BEST MODE FOR CARRYING OUT THE INVENTION

Figure 2:
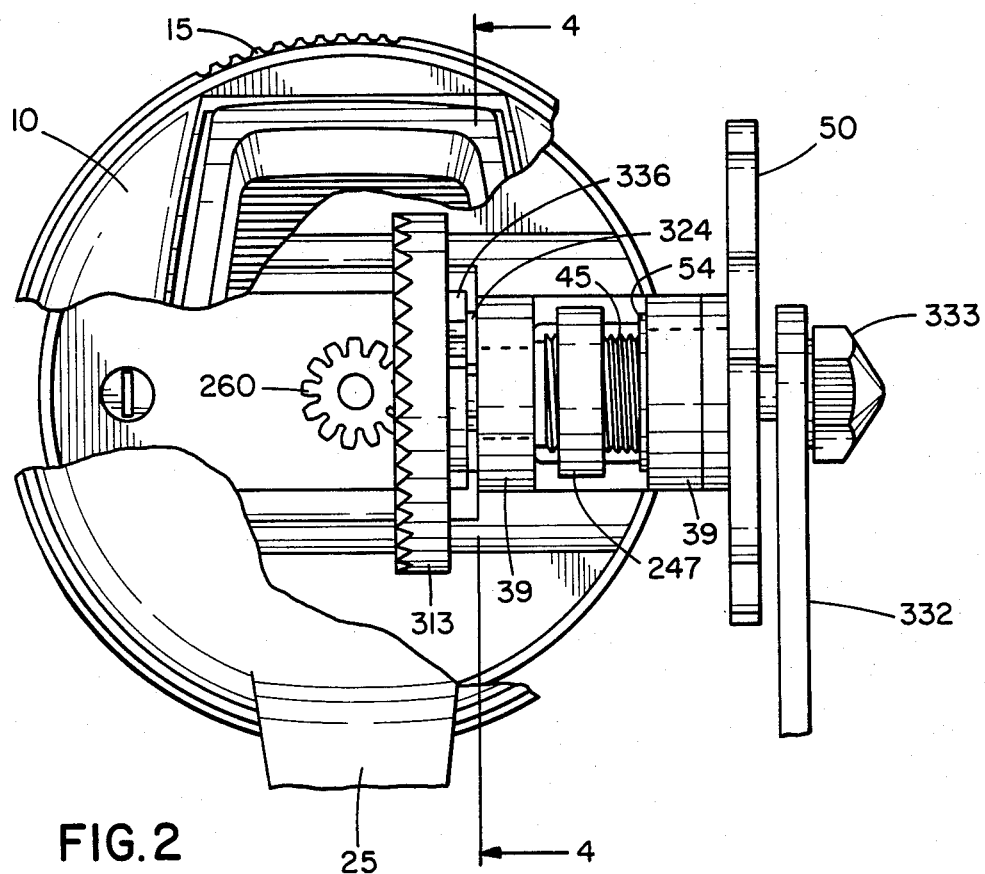
FIG. 2 is a section view of the reel showing the anti-reverse mechanism.

Referring first to FIG. 1, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The ring or cylindrically-shaped first part 11a of the front cover 11 is molded from a high impact strength plastic, such as ABS. The cone-shaped second part 11b of the front cover 11 is formed of metal, such as aluminum. The rear cover 12 can be formed of a platable grade ABS with a chrome or nickel plating. The cone-shaped second part 11b has a generally annular rearward edge portion engaging in a forwardly facing locking groove 17 formed on the second part 11b of the cover 11. The cone-shaped second part 11b has means for rigidly locking the second part 11b to the first part 11a. The cone-shaped second part 11b of the cover 11 has a conical front portion 13 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof.

A reel body 20 is provided and includes a circular mounting plate or deck plate 21 which has a forwardly extending cylindrical sleeve portion 22 integrally formed around the outer periphery thereof. The reel body 20 may be made of plastic material, such as ABS or a glass filled polycarbonate. The forward edge of the sleeve 22 has a flange 23 extending radially outwardly beyond the outer surface of the sleeve portion 22. The cylindrical first part 11a of the front cover 11 is undercut rearward of the internal thread 14 to provide a rearwardly facing shoulder 24 axially spaced from the end of the internal thread 14. The reel body 20 with the radially extending flange 23 is inserted in the rear opening of the front cover 11 with the flange 23 bearing against the shoulder 24 in the undercut portion. The rear cover 12, which has on its forwardly facing end portion an external thread 19, is threaded into the internal thread 14 of the front cover 11 until the forwardly facing edge of the rear cover 12 engages the radially outwardly extending flange 23 to trap the reel body 20 between the front cover 11 and the rear cover 12. The rear cover 12 has an integrally molded, radially extending stem 25 with a mounting foot 26 on the outer end thereof for attachment to the appropriate part of a fishing rod. The mounting foot 26 is to be attached to the upper surface of a fishing rod for use.

The rear cover 12 has a rearwardly facing opening 28 that is substantially rectangular in shape extending through a sloped upper portion and vertical rear portion thereof. A one-piece thumb button 29 has a shape substantially mating with the shape of the opening 28 in the rear cover 12 and has a pair of sidewardly extending pivots 30 on the upper forward side edges thereof which snap into slotted pivot opening 31 formed in the adjacent side walls 32 of the opening 28. A pair of sidewardly extending tabs 33 are formed on the lower side edges of the thumb button 29 such that with the thumb button 29 assembled from the inside of the rear cover 12, the sidewardly extending pivots 30 will snap into the slotted openings 31 in the walls 32 of the rear cover 12 with the sidewardly extending tabs 33 abutting a vertical inner surface of the rear cover 12 adjacent the opening 28. The tabs 33 prevent the thumb button 29 from pivoting rearwardly out of the opening 28 in the rear cover 12.

A central hub 35 is carried by and projects forward of the deck plate 21 concentric with the sleeve 22 with a drag plate 210, back spool washer 230, back flat drag washer 233, spool assembly 130, front flat drag washer 235, front spool washer 237, all retained on the hub 35 by means of spool retainer clip 240 which fits into a groove (not shown in FIG. 1) aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 in the deck plate 21. A pinion gear 260 is splined on a reduced diameter spined portion 252 of the center shaft 251 and is resiliently maintained in a forward position against the deck plate 21 by a center shaft spring 265. The spring 265 bears against an abutting end 255 on the center shaft 251 to urge the pinion gear 260 against the deck plate 21 and to urge the center shaft 251 in a rearward direction relative to the deck plate 21. The splined connection between the pinion gear 260 and center shaft 251 permits the axial sliding motion of the shaft 251 relative to the pinion gear 260 while at the same time rotation of the pinion gear 260 will rotate the center shaft 251.

Depressing the thumb button 29 moves the center shaft 251 and spinner head asembly 242 forward relative to the hub 35. As the spinner head assembly 242 moves forward, a pickup pin mechanism 243, mounted on spinner head assembly 242, will move forward of and will disengage from the front portion 241 of the hub 35 and from a cam 244 on the axial face of the front portion 241 of the hub 35 thereby retracting a pickup pin 245 from its extended position radially outward of the spinner head assembly 242. With the thumb button 29 fully depressed, a line brake member (not shown in FIG. 1) on the forward face of the spinner head assembly 242 will be urged against the inside of the cone-shaped part 11b of the front cover 11 to trap the line 99 therebetween to prevent casting of the line from the reel. Releasing the pressure on the thumb button 29 will maintain the spinner head assembly 242 in a forward casting position, but the spring 265 will retract the center shaft 251 and the spinner head assembly 242 enough to unclamp the line 99 whereby the spinner head assembly 242 will not interfere with the fishing line 99 which can then be cast freely from the reel.

The deck plate 21 also includes a rearwardly projecting boss 40 having spaced apart legs 39 with aligned transverse openings 41 therethrough for receiving, in a concentric manner, a crankshaft 42 surrounded, in part, by a cylindrical post 43. The boss 40 has a slot 44 between the legs 39, which slot 44 extends transverse to the axis of the opening 41. The slot 44 aligns with a slot (not shown in FIG. 1) in the deck plate 21 with a slide drag actuator 247 positioned in the slots and being threadably engaged with a threaded portion 45 of the post 43. The drag actuator 247 extends through the aligned slots and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and post 43 can be rotated relative to the boss 40 without the post 43 moving axially relative to the boss 40.

The projecting contact head 248 of the drag actuator 247 engages with an arcuately curved extended ramp 56 on the drag plate 210. The drag plate 210 bears against the back spool washer 230, back flat drag washer 233, spool assembly 130, front flat drag washer 235, front spool washer 237, all of which are backed against the fixed retainer clip 240. The contact head 248 of the drag actuator 247 engages with the ramp 56 and, as it is moved radially outward of the drag actuator 247, the pressure of drag on the spool 131 will be increased and, as the drag actuator 247 is moved radially inward on the ramp 56, the pressure or drag on the spool 131 will be decreased. The drag actuator 247 is advanced or moved radially inward (decreased drag) by rotating the star wheel 50 in one direction and is retracted or moved radially outward (increased drag) by rotating the star wheel 50 in the opposite direction.

The crankshaft 42, with a gear 313 attached at one end, is inserted through the post 43 in the boss 40 and has a handle 332 attached by means of a nut 333 to the other end of said crankshaft 42. The gear 313 meshes with the pinion gear 260 on the center shaft 251 so that rotation of the crank handle 332 will rotate the center shaft 251 and spinner head assembly 242.

An anti-reverse assembly 330, which is associated with the crankshaft 42, includes a ratchet 336, shown in FIG. 1A, fixed on the back of the gear 313 for rotation with the gear 313 and crankshaft 42. The anti-reverse assembly 330 further includes a pivotable pawl 321 having a pivot tab 322, a pawl tooth 323, and a pawl actuator 324. The pawl pivot tab 322 extends into a slot 325 formed in deck plate 21, the slot 325 having one wall in alignment with the one wall 329 which is offset radially inward toward the center shaft 251 from the end face 331 of the boss 40. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the midportion of the pawl 321. The pawl 321 with the pivot tab 322 in the slot 325 will have one face of the pawl 321 against the wall 329 of the boss 40 and will have the pawl tooth 323 aligned with the ratchet 336. The crankshaft 42, when telescoped in the post 43 and boss 40, will locate the pawl actuator 324 between the ratchet 336, fixed on the back face of gear 313, and the end face 331 of the boss 40 in the vicinity of the opening 41 in the boss 40, so that the pawl actuator 324 is offset slightly from the pawl 321 with the transverse actuator tab 327 engaged in the recess 328 of the pawl 321. Rotation of the crank handle 332 in a counterclockwise direction, as viewed in FIG. 1, will pivot the crankshaft 42 and the pawl actuator 324 in a counterclockwise direction which will pivot the pawl 321 in a clockwise direction around pawl pivot tab 322 to move the pawl tooth 323 out of alignment with the teeth of the ratchet 336. The crank handle 322 will, therefore, be permitted to be rotated in that direction without interference. The gripping resistance between the pawl actuator 324 and the crankshaft 42 will be overcome as soon as the pawl 321 pivots to its extreme position, whereupon the crankshaft 42 continues to rotate relative to the pawl actuator 324. Rotation of the handle 332 in the clockwise direction moves the pawl actuator 324 in the clockwise direction with the tab 327 pivoting the pawl 321 in a counterclockwise direction to move the pawl tooth 323 into the path of the ratchet teeth to stop further rotation of the crankshaft 42 and handle 332 in that direction.

Turning to FIGS. 2-6 the anti-reverse assembly 330 is shown in more detail. FIG. 2 shows the anti-reverse assembly 330 when assembled within the housing 10. As can be seen the pawl actuator 324 is sandwiched between the ratchet 336 and the boss 39 thereby firmly holding the pawl actuator in position regardless of the handling of the reel. Also shown is the relative location of the anti-reverse assembly 330 with respect to the pinion gear 260 and the handle 332.

Figure 3:
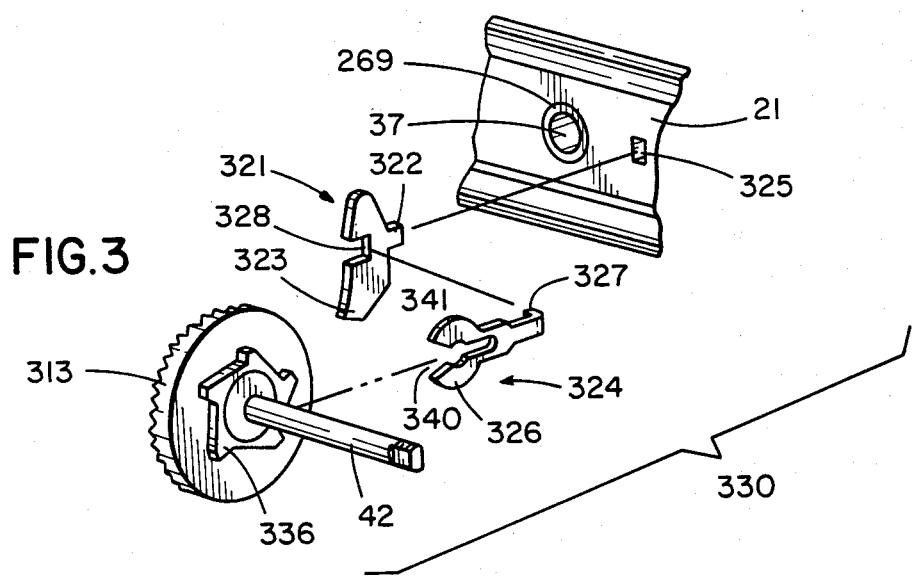
FIG. 3 is an exploded view of the anti-reverse mechanism.

FIG. 3 depicts the anti-reverse assembly 330 in exploded fashion to better illustrate the component parts of said anti-reverse assembly 330. As stated earlier the pawl 321 is mounted to the deck plate 21 for rocking motion therewith by the insertion of the pivot tab 322 into the slot 325 formed in the deck plate 21. To drive the pawl 321 the pawl actuator 324 is frictionally mounted to the crankshaft 42 so as to abut the ratchet 336. The friction mount is created by the interaction of the legs 326, of the pawl actuator 324, and their resultant shaft notch 340. As the pawl actuator 324 is forced upon the crankshaft 42 the legs 326 separate to allow the crankshaft 42 to become seated within the shaft notch 340. Once seated, the legs 326, still somewhat separated, continue to exert a force upon the crankshaft 42 due to elastic forces within the legs 326. Mounted to the crankshaft 42, the actuator tab 327 of the pawl actuator 324 extends into the recess 328 of the pawl 321. It should be noted that the transverse nature of the actuator tab 327 allows the pawl 321 to reside in the same plane as the ratchet 336.

Figure 4:
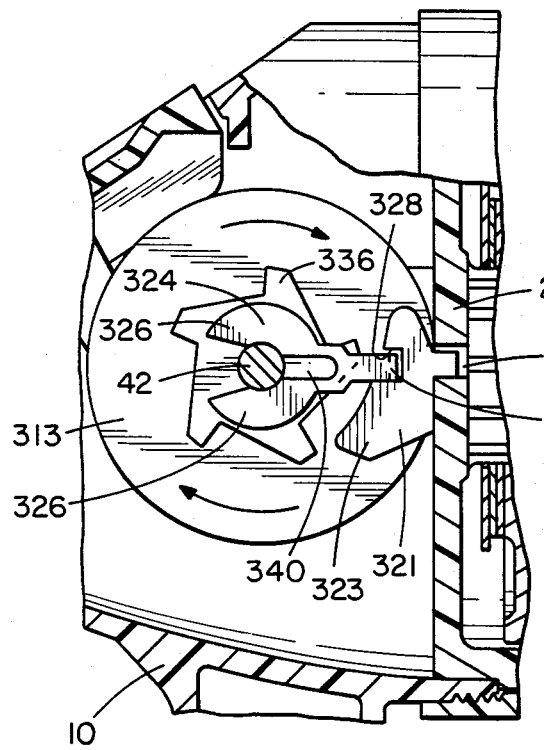
FIG. 4 is a view of the anti-reverse mechanism along line 4—4 as fishing line is being retrieved.
Figure 5:
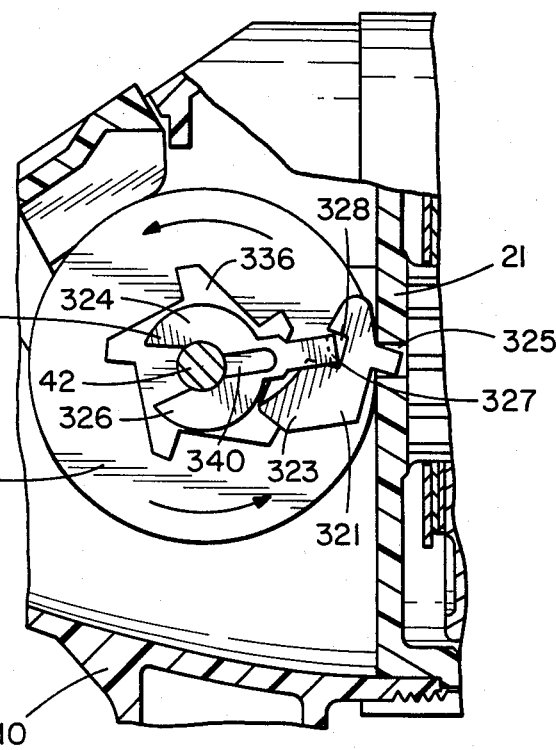
FIG. 5 is the same view as that in FIG. 4 as reverse rotation is attempted.
Figure 6:
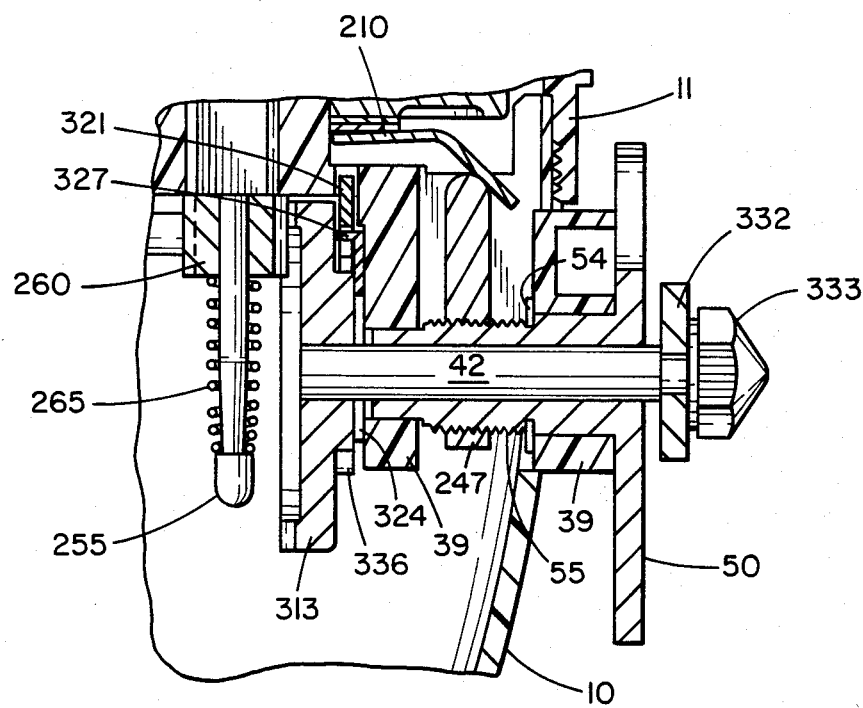
FIG. 6 is a section view of the reel and its anti-reverse mechanism.

Turning to FIGS. 4-6 with the above structure in mind, the detailed operation of the anti-reverse mechanism 330 can be set forth. As the handle 332 (not shown in FIGS. 4 and 5) is rotated to retrieve fishing line, the crankshaft 42 and gear 313 are rotated clockwise as shown in FIGS. 4 and 5. This clockwise rotation of the carankshaft 42 also imparts a clockwise rotation to the pawl actuator 324 and, due to the location of the actuator tab 327 within the recess 328, causes the pawl 321 to pivot in a counterclockwise direction. In pivoting counterclockwise, the pawl 321 moves such that the pawl tooth 323 withdraws from the ratchet 326 until the pawl 321 ultimately becomes pinned against the deck plate 21 by the pawl actuator 324. In this position, as shown in FIG. 4, the crankshaft 42, overcoming the friction between itself and the pawl actuator 324, freely rotates to permit the retrieval of fishing line. The pawl 321 remains so positioned during line retrieval due to the continued frictional interaction between the pawl actuator 324 and the crankshaft 42.

When reverse rotation of the handle 322 is attempted, the crankshaft 42 and the gear 313 proceed to rotate in a counterclockwise direction as shown in FIG. 5. This motion results in the pawl actuator 324 also rotating in a counterclockwise fashion. In doing so the actuator tab 327 within the recess 328 causes the pawl 321 to pivot in a clockwise direction. The pivoting of the pawl 321 continues until once again the pawl 321 is pinned between the deck plate 21 and the pawl actuator 324. During the pivoting of the pawl 321, the pawl tooth 323 engages the ratchet 336 which is mounted to the shaft 42 as shown in FIGS. 5 and 6. The end result is that the ratchet 336, crankshaft 42 and handle 322 are restrained from further counterclockwise, reverse rotation. The pawl 321 is maintained in this interfering position due to the location of the pawl actuator 324 and the force of the ratchet 336 against the pawl tooth 323 as reverse rotation is attempted. As shown in FIG. 6, since the crankshaft 42 cannot be so rotated, the pinion gear 260 likewise cannot reversely rotate thereby forcefully preventing the reverse rotation of the fishing line retrieval mechanism heretofore described.

While I have shown and described certain embodiments of an anti-reverse mechanism, it is to be understood that it is capable of many modifications. Changes, therefore, in the construction and arrangement may be made without departing from the spirit and scope of the mechanism set forth above and as described in the attached claims.

I claim:

1. In a spinning reel having a body portion with a deck plate, and a fishing line retrieval mechanism having a centershaft with a pinion gear thereon, a crankshaft extending through a boss carried by the deck plate and having a gear meshing with the pinion gear, the crankshaft being rotated by the rotation of a handle by an operator for retrieval of fishing line, an anti-reverse mechanism comprising:

a ratchet mounted on the crankshaft immediately adjacent the gear for rotation therewith;

a pawl lying in a plane common with the plane of the ratchet and having a pivot tab loosely fitting into a slot in the deck plate, the pawl having a pawl tooth for engaging the ratchet to prevent reverse rotation of the crankshaft; and an actuator having a pair of legs with a notch therebetween for frictionally engaging the the crankshaft in a plane immediately adjacent to and parallel to the plane of the ratchet, the actuator is held between the boss on the deck plate and ratchet and is frictionally rotatable in either direction in response to rotation of the crankshaft, the actuator having a tab extending transverse to the plane of the actuator;

the pawl having a recess opposing the pivot tab, the tab on the actuator engaging with the recess in the pawl, the pawl being maintained on the reel and the pivot tab retained in the slot solely by the tab on the actuator engaging in the recess on the pawl, whereby rotation of the crankshaft in a first direction causes the actuator to rotate and the actuator tab to pivot the pawl tooth out of engagement with the ratchet for fishing line retrieval, and rotation of the crankshaft in a second, reverse direction causes the actuator to rotate and the actuator tab to pivot the pawl to engage the pawl tooth with the ratchet to prevent further reverse rotation of the crankshaft.

2. In a spinning reel having a body portion with a deck plate, and a fishing line retrieval mechanism having a centershaft with a first gear thereon drivably connected to a second gear on a crankshaft, the crankshaft having a handle thereon for rotation by an operator for retrieval of fishing line, an anti-reverse mechanism comprising:

a ratchet fixed for rotation with said crankshaft;

a pawl lying in a plane common with the plane of the ratchet and having a tab and an opposing recess, said tab loosely fitting in a slot in said deck plate, and a pawl tooth for engaging the ratchet to prevent reverse rotation of the crankshaft;

an actuator lying in a plane adjacent the plane of the pawl and ratchet, and frictional engaging the crankshaft for rotation therewith, said actuator having a tab extending transverse to the actuator plane and received in the pawl recess, whereby rotation of the crankshaft in a positive direction pivots the actuator so that the actuator tab rocks the pawl about the pawl tab to a position where the pawl tooth is free from engagement with the ratchet, and rotation of the crankshaft in the reverse direction pivots the actuator so that the actuator tab rocks the pawl about the pawl tab to a position where the pawl tooth engages the ratchet to prevent further reverse rotation of the crankshaft.

3. The anti-reverse mechanism of claim 2, wherein the actuator includes a pair of legs with the crankshaft frictionally grasped between the legs, and the crankshaft slips between the legs upon further rotation of the crankshaft after pivoting of the actuator places the pawl in either the free position or the engaging position.

4. The anti-reverse mechanism of claim 2, wherein the pawl has a convex surface about the pawl tab, the surface rocking on the deck between the free position and the engaged position of the pawl.

* * * * *